(12) United States Patent
Choi

(10) Patent No.: US 6,794,087 B2
(45) Date of Patent: Sep. 21, 2004

(54) LITHIUM BATTERY HAVING EVENLY COATED NEGATIVE ELECTRODE AND METHOD OF MANUFACTURE THEREOF

(75) Inventor: Yun-Suk Choi, Cheonan (KR)

(73) Assignee: Samsung SDI Co., Ltd., Suwon-Si (KR)

(*) Notice: Subject to any disclaimer, the term of this patent is extended or adjusted under 35 U.S.C. 154(b) by 0 days.

(21) Appl. No.: 09/876,151

(22) Filed: Jun. 8, 2001

(65) Prior Publication Data

US 2002/0037457 A1 Mar. 28, 2002

(30) Foreign Application Priority Data

Jun. 13, 2000 (KR) ........................................ 2000-32515

(51) Int. Cl.⁷ ................................................ H01M 4/48
(52) U.S. Cl. .............................. 429/231.95; 429/218.1; 429/245; 429/233; 429/232; 29/623.5
(58) Field of Search ..................... 429/231.95, 218.1, 429/233, 245, 217, 232; 29/623.5

(56) References Cited

U.S. PATENT DOCUMENTS

| | | | | |
|---|---|---|---|---|
| 4,888,206 A | * | 12/1989 | Hope et al. | 427/457 |
| 5,217,827 A | * | 6/1993 | Fauteux et al. | 429/310 |
| 5,411,764 A | * | 5/1995 | Koksbang | 427/383.7 |
| 5,961,672 A | * | 10/1999 | Skotheim et al. | 29/623.5 |
| 6,225,002 B1 | * | 5/2001 | Nimon et al. | 429/212 |
| 6,350,543 B2 | * | 2/2002 | Yang et al. | 429/224 |
| 6,410,181 B1 | * | 6/2002 | Spillman et al. | 429/101 |
| 6,534,214 B1 | * | 3/2003 | Nishijima et al. | 429/212 |

FOREIGN PATENT DOCUMENTS

JP   4-22068 A1  *  1/1992

* cited by examiner

Primary Examiner—Laura Weiner
(74) Attorney, Agent, or Firm—Staas & Halsey LLP

(57) ABSTRACT

A lithium battery including a lithium negative electrode, a positive electrode, a separator and an electrolyte. The lithium negative electrode is prepared by melting lithium metal under an inert gas atmosphere to prepare a liquid lithium metal and coating the liquid lithium metal on a current collector. The positive electrode includes a positive active material, an electrically conductive material, and a binder. The separator is placed between the positive and the negative electrodes, and the electrolyte is immersed in the positive and negative electrodes and separator, and includes a lithium salt and organic solvents.

13 Claims, No Drawings

LITHIUM BATTERY HAVING EVENLY COATED NEGATIVE ELECTRODE AND METHOD OF MANUFACTURE THEREOF

CROSS-REFERENCE TO RELATED APPLICATIONS

This application is based on Korean Application No. 2000-32515 filed in the Korean Industrial Property Office on Jun. 13, 2000, the content of which is incorporated hereinto by reference.

BACKGROUND OF THE INVENTION

1. Field of the Invention

The present invention relates to a lithium battery, and more specifically, to a lithium battery with an electrode evenly coated with active materials.

2. Description of the Related Art

Lithium-sulfur batteries use sulfur-based compounds as a positive active material and lithium metal, its alloys, or carbon-based compounds as a negative active material. In the negative electrode, the lithium metal is plated on charge and is reoxidized to lithium ion on discharge. The carbon-based compounds are compounds into or from which alkaline metal such as lithium or metal ion, such a lithium ion, is intercalated or deintercalated. The lithium-sulfur battery uses a material dissolving polysulfide as an electrolyte. In the positive electrode, on discharge, sulfur-sulfur bonds in the sulfur-based compound are cleaved by the electrolytic reduction to decrease the oxidation number of S. On charging, the inherent sulfur-sulfur bonds are reformed by electrolytic oxidation to increase the oxidation number of S. The electrical energy is stored in the battery cell as the chemical energy during charging and it is converted back to electrical energy during discharging.

Lithium is useful and attractive as an active material in an organic electrolyte battery because it has high energy density and good rechargeability.

A lithium negative electrode may be made of either the lithium metal itself, since the lithium metal serves as an active material as well as a current collector, or coating the lithium metal on a metal current collector substrate such as Cu or Ni. Such current collectors are often used since these metals have a much better mechanical strength than the lithium metal itself. The coating may be accomplished by vapor depositing evaporated lithium onto a current collector substrate for a desired thickness, or by pressing a lithium metal foil onto another metal foil such as Cu or Ni or a perforated current collector substrate such as an expanded metal sheet.

However, the vapor deposition process is expensive, and is difficult to control the process. In addition, the pressing techniques often result in weak adhesion, and it s also difficult to control the process. Also, since the lithium metal foil is soft, it easily forms an uneven film during the pressing process. Further, the lithium metal is extremely reactive with water, which causes the lithium to readily react with ambient moisture forming an undesirable surface film of an oxide or hydroxide. Such surface film interferes with a good adhesion between the current collector and the active material. In addition, such film at the lithium electrode surface interferes with a uniform electrode reaction throughout the surface of the electrode, thereby deteriorating the battery's performance and life cycle characteristics.

SUMMARY OF THE INVENTION

It is an object of the present invention to provide a lithium battery including a stable negative electrode in which lithium metal is uniformly coated on a current collector substrate.

It is another object of the present invention to provide a lithium battery having a lithium electrode welded to a current collector substrate without an oxide film in between, by securely attaching a lithium metal onto the current collector through a simple process.

Additional objects and advantages of the invention will be set forth in part in the description which follows and, in part, will be obvious from the description, or may be learned by practice of the invention.

In order to achieve the above and other objects, a lithium battery includes a lithium negative electrode, a positive electrode, a separator placed between the negative and the positive electrodes, and an electrolyte soaked into an assembly of the negative and the positive electrodes and the separator, the negative electrode is prepared by melting a lithium metal under a gas atmosphere to prepare a liquid lithium metal and coating the liquid lithium metal on a current collector, the positive electrode includes an electrically conductive metal and a binder, and any positive active material which is compatible with the lithium negative electrode.

According to an aspect of the invention, the positive active material includes at least one sulfur-based material selected from elemental sulfur, solid $Li_2S_n$ ($n \geq 1$), and $Li_2S_n$ ($n \geq 1$) dissolved in the catholyte.

According to another aspect of the invention, the electrolyte includes a lithium salt and an organic solvent or a mixture of organic solvents.

DETAILED DESCRIPTION OF THE PREFERRED EMBODIMENTS

Reference will now be made in detail to the present preferred embodiments of the present invention.

A lithium battery of the present invention uses lithium metal as a negative active material. The lithium metal has high energy density and good rechargeability. The negative electrode preparation is illustrated in detail below. The lithium metal is melted under inert gas atmosphere to prepare a liquid lithium metal. The inert gas atmosphere is preferably argon (Ar) and free of moisture and oxygen. If the melting process is carried out under an atmosphere of the moisture and oxygen, it may cause the lithium metal and surface of a current collector substrate metal to react with moisture and oxygen, preventing good adhesion of the lithium on the current collector substrate. The lithium melting process may be performed by using a general metal melting process. For instance, the lithium metal is heated at 190 to 250° C. under an inert gas atmosphere to melt the lithium metal to obtain the liquid lithium metal.

The liquid lithium metal is coated on a metal current collector substrate to a desired thickness. A coating process can be any general coating process. For instance, the coating process can be performed with either a doctor blade or by using a calendering process with a roller as the liquid metal is uniformly coated on the surface of the pre-heated current collector substrate. The metal current collector may be nickel or copper, or a metal-sprayed nickel or copper. The metal includes lithium-wetting metals such as Al, Si, Sn and other lithium-wetting metals or alloys. According to the coating steps, the liquid lithium metal is strongly and uniformly attached to the current collector. As a result, a high performance lithium electrode is fabricated for an improved battery performance.

A positive electrode may be any rechargeable positive electrode which is compatible with the lithium negative electrode. For example, the positive electrode is a positive active material using elemental sulfur, solid $Li_2S_n$ (n≧1), and $Li_2S_n$ (n≧1) dissolved in catholyte. In addition, at least one of organo-sulfur or carbon-sulfur polymer (($C_2S_x)_n$, wherein, x=2.5–50, n≧2) may be used. In order to prepare a positive electrode, a binder is dissolved in an organic solvent to prepare a binder solution, and an electrically conductive material is added to the solution and dispersed. Then, the positive active material is added to the resulting material to prepare a positive active material slurry. The positive active material slurry is coated on a current collector substrate to prepare the positive electrode.

For example, as the current collector, a carbon coated aluminum substrate may be used. The electrically conductive material may include carbon, carbon black, other electrically conductive compounds, or a mixture thereof. The binder may include polyvinylidene fluoride, polytetrafluoroethylene, polyvinyl acetate, polyethylene oxide, polypyrrolidone, or polyvinyl alcohol. The organic solvent may be any organic solvent known in the related art, such as acrylonitrile.

An electrolyte includes a lithium salt and an organic solvent or solvents. The organic solvent may be any conventional organic solvent known in the related art such as 1,3-dioxolane, diglyme, sulforane, dimethoxy ethane, or a mixture thereof. The lithium salt may be any lithium salt known in the related art, such as $LiSO_3CF_3$, lithium triflate, lithium perchlorate, $LiPF_6$ or $LiBF_4$.

Hereinafter, the present invention will be explained in detail with reference to the examples. These examples, however, should not in any sense be interpreted as limiting the scope of the present invention.

EXAMPLE 1

Lithium metal was melted at 250° C. under an inert gas atmosphere (argon Ar) that is moisture and oxygen-free to prepare a liquid lithium metal. The liquid lithium metal was coated on a pre-heated Al-sprayed nickel collector with a pre-heated doctor blade to prepare a negative electrode having a lithium coating thickness of roughly 250 μm.

A polyvinylacrylate binder was dissolved in an acrylonitrile solvent to prepare a binder solution. A carbon powder conductive agent was added to the binder solution and dispersed. Thereafter, elemental sulfur (SB) powder with an average diameter of about 20 μm for an active material was added to the resulting mixture and stirred with a ball mill for a day to prepare a positive active material slurry. At this time, the ratio of $S_B$: binder: conductive agent was 60:20:20 wt %.

The slurry was coated on carbon-coated Al substrate and dried at 80° C. for 1 hour using a drying furnace. The dried material was pressed into 50 μm of thickness with a roll press to prepare a positive electrode.

The positive electrode was stored over one day in a vacuum oven (60° C.) and then moved into an Ar-filled glove box in which the moisture and the oxygen level was controlled. The following processes proceeded in the glove box. The positive electrode and the negative electrode were cut into a determined size and tabs for each positive electrode and negative electrode were attached therein. A polyethylene separator was placed between the positive electrode and the negative electrode. Then, the positive and negative electrodes were wound under constant tension, inserted into a pouch and securely sealed except for the portion through which an electrolyte was introduced. Fabrication of the lithium-sulfur cell was completed by injecting the electrolyte of 1 M $LiSO_3CF_3$ in 1,3-dioxolane/diglyme/sulforane/dimethoxyethane (50:20:10:20 volume ratio), and then sealing the unsealed part of the pouch.

EXAMPLE 2

Using a calendaring process, a band of a bare nickel foil from a continuous roll was passed through a pool of molten lithium using a guiding roller in the molten lithium pool, and then passed through a doctor blade to control its thickness as a substrate foil came out of the molten lithium pool the substrate foil was cooled below the melting temperature of lithium. As a result, a negative electrode plate was obtained.

A lithium-sulfur cell was fabricated by the same method as in Example 1 by using the negative electrode plate.

COMPARATIVE EXAMPLE 1

A lithium-sulfur cell was fabricated by the same method as in Example 1 except that a negative electrode was prepared by pressing a lithium foil into a nickel current collector.

COMPARATIVE EXAMPLE 2

A lithium-sulfur cell was fabricated by the same method as in Example 1 except that the lithium metal foil was used as a negative electrode for a lithium-sulfur battery.

Lithium-sulfur cells according to Example 1 and Comparative Example 1 were charged at 0.1 C for 1 hour and discharged at 0.4C to 1.8V. A capacity retention (remaining capacity %) for the first cycle was measured and the results are presented in Table 1.

TABLE 1

|  |  | Cycles | | |
| --- | --- | --- | --- | --- |
|  |  | 1st | 50th | 100th |
| Comparative example 1 | Capacity (mAh/g) | 550 | 467 | 303 |
|  | Remaining capacity (%) | 100 | 85 | 55 |
| Comparative example 2 | Capacity (mAh/g) | 559 | 486 | 336 |
|  | Remaining capacity (%) | 100 | 87 | 60 |
| Example 1 | Capacity (mAh/g) | 560 | 504 | 392 |
|  | Remaining capacity (%) | 100 | 90 | 70 |

As can be seen from Table 1, the cell of Example 1 has better capacity and exhibited reduced capacity loss by charging and discharging the cells than experienced by the cells in Comparative examples 1 and 2.

Therefore, according to the present invention, the lithium active material and current collector can be strongly attached so that it is easy to assemble a battery. Moreover, since lithium can be coated on the current collector with an even thickness, the present invention can provide a negative electrode plate having an even electrode reaction.

While the present invention has been described in detail with reference to the preferred embodiments, those skilled in the art will appreciate that various modifications and substitutions can be made thereto without departing from the spirit and scope of the present invention as set forth in the claims and their equivalents.

What is claimed is:

1. A lithium battery comprising:
   a lithium negative electrode prepared by melting lithium metal under an inert gas atmosphere and coating the liquid lithium metal uniformly on a metal current collector;

a positive electrode including a binder;

a separator placed between the positive and negative electrodes; and an electrolyte comprising a lithium salt and organic solvents, contained in the positive and negative electrodes and the separator, wherein the current collector is nickel, copper or a metal-sprayed nickel or copper, and the metal being sprayed is a lithium-wetting metal, wherein the lithium-wetting metal is selected from the group consisting of Al, Si, and Sn, and wherein the lithium battery retains 90% or greater of a capacity at a fiftieth charging and discharging cycle as compared to a capacity at a first charging and discharging cycle.

2. The lithium battery according to claim 1, wherein the liquid lithium metal is coated using a doctor blade.

3. The lithium battery according to claim 1, wherein the liquid lithium metal is coated using a calendering process.

4. The lithium battery according to claim 1, wherein the binder is selected from the group consisting of polyvinylidene fluoride, polytetrafluoroethylene, polyvinyl acetate, polyethylene oxide, polypyrrolidone, and polyvinyl alcohol.

5. The lithium battery according to claim 1, wherein the lithium battery retains 70% or greater of a capacity at the one hundredth charging and discharging cycle as compared to the capacity at the first charging and discharging cycle.

6. A lithium-sulfur battery comprising:

a lithium negative electrode prepared by melting lithium metal under an inert gas atmosphere and coating the liquid lithium metal on a metal current collector;

a positive electrode comprising a positive active material, an electrically conductive material and a binder, the positive active material comprising at least one sulfur-based material selected from the group consisting of elemental sulfur and solid $Li_2S_n(n \geq 1)$ coated on a current collector;

a separator placed between the positive and negative electrodes; and an electrolyte comprising a lithium salt and organic solvents, contained in the positive and negative electrodes and the separator, wherein the current collector is nickel, copper or a metal-sprayed nickel or copper, and the metal being sprayed is lithium-wetting metal.

7. The lithium-sulfur battery according to claim 6, wherein the liquid lithium metal is coated using a doctor blade.

8. The lithium-sulfur battery according to claim 6, wherein the liquid lithium metal is coated using a calendering process.

9. The lithium-sulfur battery according to claim 6, wherein the lithium wetting metal is selected from the group consisting of Al, Si, and Sn.

10. The lithium-sulfur battery according to claim 6, wherein the binder is selected from the group consisting of polyvinylidene fluoride, polytetrafluoroethylene, polyvinyl acetate, polyethylene oxide, polypyrrolidone, and, polyvinyl alcohol.

11. The lithium battery according to claim 6, wherein the lithium battery retains 90% or greater of a capacity at the fiftieth charging and discharging cycle as compared to the capacity at the first charging and discharging cycle.

12. The lithium battery according to claim 6, wherein the lithium battery retains 70% or greater of a capacity at the one hundredth charging and discharging cycle as compared to the capacity at the first charging and discharging cycle.

13. A method of manufacturing a lithium battery, comprising:

melting a lithium metal under a gas atmosphere to produce a liquid lithium metal;

coating the liquid lithium metal on a current collector to create a negative electrode;

obtaining a positive electrode that includes a binder a positive electrode including a binder;

placing a separator between the positive and negative electrodes to produce an assembly; and soaking an electrolyte into the assembly, wherein the lithium battery retains 90% or greater of a capacity at a fiftieth charging and discharging cycle as compared to a capacity at a first charging and discharging cycle.

* * * * *